(12) United States Patent
Luciew

(10) Patent No.: US 10,471,908 B2
(45) Date of Patent: Nov. 12, 2019

(54) LOAD BOX RAIL TRIM WITH INTEGRATED STRUCTURAL FEATURES

(71) Applicant: Ford Global Technologies LLC, Dearborn, MI (US)

(72) Inventor: Simon Luciew, Ardeer (AU)

(73) Assignee: Ford Global Technologies LLC, Dearborn, MI (US)

(*) Notice: Subject to any disclaimer, the term of this patent is extended or adjusted under 35 U.S.C. 154(b) by 103 days.

(21) Appl. No.: 15/872,817

(22) Filed: Jan. 16, 2018

(65) Prior Publication Data

US 2018/0244213 A1 Aug. 30, 2018

(30) Foreign Application Priority Data

Feb. 27, 2017 (CN) .......................... 2017 1 0110223

(51) Int. Cl.
| | |
|---|---|
| *B60R 13/01* | (2006.01) |
| *B60P 7/08* | (2006.01) |
| *B60R 11/00* | (2006.01) |

(52) U.S. Cl.
CPC ............ *B60R 13/01* (2013.01); *B60P 7/0815* (2013.01); *B60R 2011/004* (2013.01); *B60R 2011/0084* (2013.01); *B60R 2011/0094* (2013.01)

(58) Field of Classification Search
CPC ..... B60P 7/0815; B60P 7/0807; B60P 7/0823; B60P 7/15; B60P 7/083; B60P 3/073; B60P 3/40; B60P 7/0892; B60R 13/01; B60R 7/02; B60R 9/0485; B60R 22/18; B60R 22/24; B60R 25/00; B60R 5/04; B60R 7/08

USPC ........ 410/102, 106, 104, 101, 110, 105, 111, 410/98, 90, 80, 7, 32; 248/503, 535, 538, 248/542, 500, 539, 222.52; 296/100.07, 296/63, 57.1, 40, 36, 30, 41, 204
See application file for complete search history.

(56) References Cited

U.S. PATENT DOCUMENTS

| | | | | |
|---|---|---|---|---|
| 4,604,013 | A * | 8/1986 | Elwell ................... | B60P 7/0815 296/41 |
| 5,150,940 | A * | 9/1992 | Kennedy ................ | B60R 13/01 24/297 |
| 5,228,736 | A | 7/1993 | Dutton | |
| 5,267,820 | A * | 12/1993 | Sturtevant .............. | B60R 13/01 296/39.2 |
| 5,301,913 | A | 4/1994 | Wheatley | |
| 5,827,023 | A | 10/1998 | Stull | |

(Continued)

*Primary Examiner* — D Glenn Dayoan
*Assistant Examiner* — Sunsurraye Westbrook
(74) *Attorney, Agent, or Firm* — Vichit Chea; Kolitch Romano LLP

(57) ABSTRACT

Load box rail trims used or placed on a top of box rail of a truck including an elongated body formed by walls and having an opening along a length of the body, at least one structural feature integrated on the body, where the body and structural feature are formed in an injection molding process. In some examples, the walls of the body include a top wall, a first sidewall, a second sidewall, and an opening where the opening opposite to the top wall, and where a plurality ribs disposed in a space of the hollow body may include a central rib substantially perpendicular to the top wall along a length direction of the body and inside the body. The central rib is disposed between the first and second sidewalls substantially along the length of the hollow body or partially along the length of the hollow body.

20 Claims, 13 Drawing Sheets

(56) References Cited

U.S. PATENT DOCUMENTS

| | | | |
|---|---|---|---|
| 6,350,089 B1 * | 2/2002 | Tekavec | B60P 7/0807 |
| | | | 410/101 |
| 7,001,122 B2 | 2/2006 | Bommarito | |
| 7,549,828 B2 | 6/2009 | Smith | |
| 8,657,542 B2 * | 2/2014 | Liu | B60P 7/0815 |
| | | | 410/104 |

* cited by examiner

LOAD BOX RAIL TRIM WITH INTEGRATED STRUCTURAL FEATURES

RELATED APPLICATION

This application claims the benefit of Chinese Patent Application No.: CN 201710110223.7 filed on Feb. 27, 2017, the entire contents thereof being incorporated herein by reference.

FIELD

The present disclosure relates generally to motor vehicles, in particular, relates to load box rail trims with integral structural features and formed from an injection molding.

BACKGROUND

Load box rail trims in a truck are usually blow molded or are extruded aluminum. Blow molding process is expensive, time consuming, and the load box rail trims made can have varying wall thicknesses that are hard to control. In addition, the cross sections of the load box rail trims made from blow molding have closed loop and thus fasteners and metal bracket are required to connect the rail trims to the load box of the truck. The inventor of this application has recognized a need for load box rail trims that improve upon and advance the design of known load box rail trims,

SUMMARY

The present disclosure is directed to load box rail trim used or placed on a top of a load box of a truck. In some examples, the load box rail trim includes an elongated body formed by walls and having an opening along a length of the body. There may be at least one structural feature integrated on the body, where the body and the at least one structural feature are formed in an injection molding process. In some examples, the walls of the body include a top wall, a first sidewall, a second sidewall, and an opening where the opening opposite to the top wall. The structural feature may be a plurality ribs disposed in a space of the hollow body, and may include a central 1 rib substantially perpendicular to the top wall along a length direction of the body and inside the body. The central rib is disposed between the first and second sidewalls substantially along the length of the hollow body or partially along the length of the hollow body.

In addition to or in place of the central rib, structural features may include a plurality of ribs, and configurations of the plurality of ribs can be different along a length of the body. These ribs may be lateral ribs substantially parallel to the top wall and disposed on the central rib along a predetermined length. These lateral ribs can also be configured to retain a trim cover. Turning back to the central rib, it may be disposed in the opening of the body along the length of the body and extends over a lowest surface of the body. The central rib may include an aperture to receive a fastening member. Doing this allows the central rib to be secured to the truck bed. Alternatively, the central rib may be configured to have a shape to be fitted into a receiving part of a connector.

In alternate embodiments, the invention may have a facia coupled on the body. To do this, edge portions of the first and second sidewalls of the body include dovetail features and edge portions of the facia includes corresponding dovetail features and wherein the facia is snap fit with the body via the dovetail features. The facia is disposed adjacent and along a length of the body, and at least portion of the facia is configured to have a shape conforming with a shape of the body. The facia includes a top wall, sidewalls and an opening opposite to the top wall. The body includes an elongated plate and is snap fit along an edge of the sidewalls of the facia. Features of the body and facia may be integrally formed, and both may be separate pieces formed in an injection molding.

When a facia is used, the body may include a plurality of ribs and a plurality of openings on one of the rib and the wall to provide a connection with a load box and the structural feature is different along a length of the body. The facia is connected to the body via snap fitting and via a fastener. The central rib includes an aperture to receive a fastening member. There may also be an inner trim cover having a lower end and an upper end. The inner sidewall of the rail trim includes a groove at an edge portion, and the inner trim cover is made from flexible material and is connected to the rail trim by inserting the upper end to the groove and flex the lower end into the aperture of the central rib. Alternatively, the inner trim cover is connected to the rail trim by inserting the upper end of inner trim cover to the groove and then connecting the lower end to the aperture of the central rib via a fastener. The connector includes a plate having a first portion and a second portion, and the plate is configured to have the first portion to contact an end of the central rib and the second portion to contact a sheet metal of the load box such that the plate is retained by interference and wherein the second portion is fixed to the sheet metal by a fastener. The first portion and second portion may have a curved shape to impart flexibility to the plate.

DETAILED DESCRIPTION

The disclosed load box rail trims will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various load box rail trims are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1A-1D, a first example of a load box rail trim formed by injection molding, load box rail trim 100, will now be described. Load box rail trim 100 may be disposed on a top of a sidewall 103 of a load box of a truck to provide appealing appearance of load box. In some embodiments, load box rail trim 100 may be made from an injection molding from grained UV grade plastics, or other high strength material suitable for automotive exteriors.

Figure 1A:
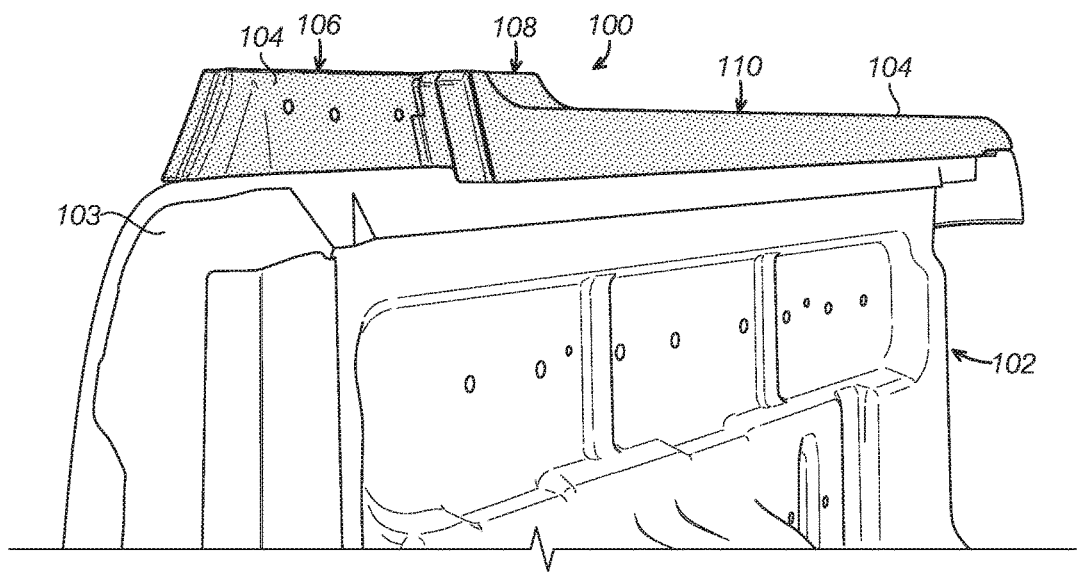
FIG. 1A is a perspective view of a first example of a load box rail trim as it may be used with a truck bed.

Turning to FIG. 1A, load box rail trim 100 may be attached to a truck bed 102. Load box rail trim 100 sits atop one edge of the truck bed to protect the truck bed 102 from scratching, denting, and other cosmetic and structural damage. Load box rail trim 100 may also include other features, such as rope or tie-down attachment points, tool box attachments, cargo area covers or other vehicle improving features. Load box rail trim 100 may be attached to both sides of the truck bed 102. Because the features of load box rail trim 100 are mirrored each other, only one side of the box rail trim 100 will be described and explained in this application. It will be appreciated that any feature shown and described may be mirrored to represent the invention being used on the opposite side of the truck bed.

As can be seen in FIG. 1A, load box rail trim 100 may include an elongated body 104. The elongated body 104 may be formed as one piece. The elongated body 104 may have different configuration along its length, that is, cross sections of the elongated body 104 differs along its length depending on a shape of a connecting part (e.g., sport hoop spoiler) and a need to provide structural features for attachments. For purpose of the illustration, the elongated body 104 may be subdivided into three main sections or zones, a front zone 106, a transition zone 108, and a rear zone 110. The front zone 106 may include walls and an opening to provide structural features to the elongated body 104. Additionally, the front zone 106 may also include an internal support structure to further provide a structurally stable and strong rail trim. The transition zone 108 may include walls and an opening, as well as a plurality of ribs to also provide a strong rail trim. In other examples, the transition zone 108 may include a rib extending below the walls that is capable of fastening to a truck bed. The rear zone 110 may include walls and an opening, as well as a rib extending below the walls that is capable of fastening to a truck bed. In other examples, the rear zone 110 may include an outer trim cover as well as an inner trim cover. Still in other examples, the rear zone 110 may include different types of connectors that may utilize bolts, plates, or any combination thereof.

Figure 1B:
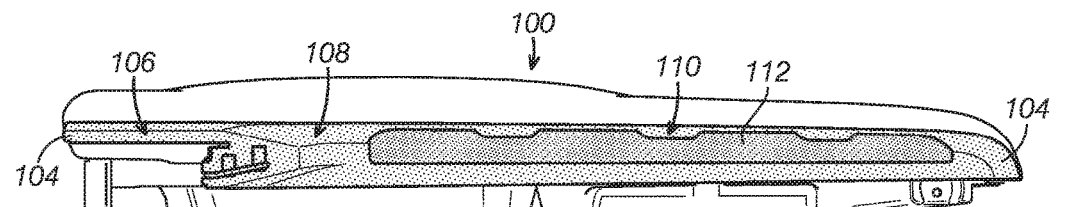
FIG. 1B is a top view of the load box rail trim shown in FIG. 1A, depicting the load box rail trim with a top cover.

Turning to FIG. 1B, load box rail trim 100 may also include a top cover 112 in the rear zone 110. The top cover 112 functions to cover any underlying bolts or attachment mechanisms necessary to attach load box rail trim 100 to the truck bed. In this example embodiment, the top cover 112 includes a thin, elongated body that may snap or otherwise attach to the rear zone 110 of load box rail trim 100.

Figure 1C:
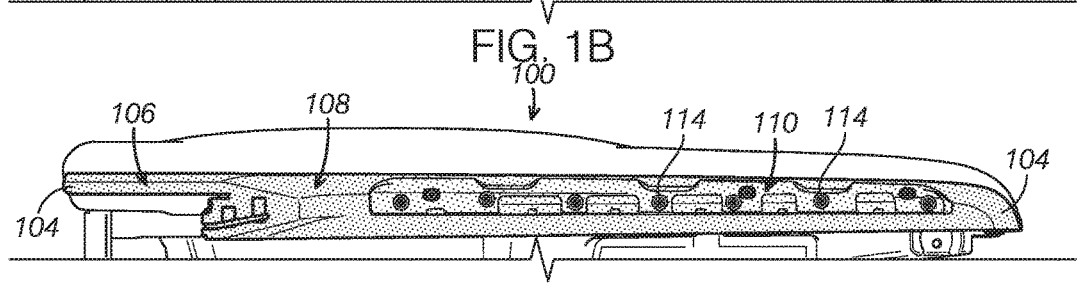
FIG. 1C is a top view of the load box rail trim shown in FIG. 1A, depicting the load box rail trim without a top cover, exposing underlying top bolts.

Turning to FIG. 1C, load box rail trim 100 may include top bolts 114 located in the rear zone 110. The top bolts 114 may be used to secure load box rail trim 100 to a truck bed. In FIG. 1c, the top cover is removed to expose a possible layout of the top bolts 114, where three top bolts 114 are used. In alternate embodiments, more or less than three top bolts 114 may be used. Still, in alternate embodiments, top bolts may not be necessary to secure load box rail trim 100.

Figure 1D:
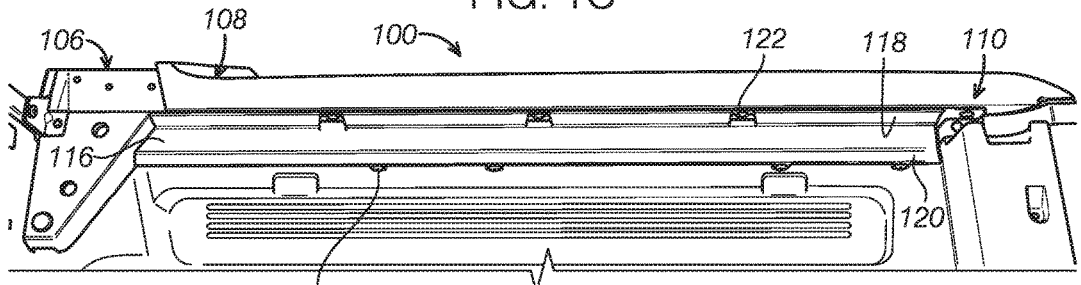
FIG. 1D is a side view of the load box rail trim shown in FIG. 1A, depicting a trim cover covering bolts that may be used to attach the load box rail trim to a truck bed.

Turning to FIG. 1D, load box rail trim 100 may include an inner trim cover 116. The inner trim cover 116 functions to cover any connectors, bolts, screws, snaps, or other attachment mechanisms that may be necessary to secure load box rail trim 100 to a truck bed. Trim cover 116 may include an upper end 118 and a lower end 120. The inner trim cover 116 may be attached to load box rail trim 100 and to the truck bed using clips 122, or any attachment mechanism on the upper end 118 and lower end 120. The inner trim cover 116 may cover substantially an entire length of the truck bed and load box rail trim 100, or any section or portion thereof.

Figure 2A:
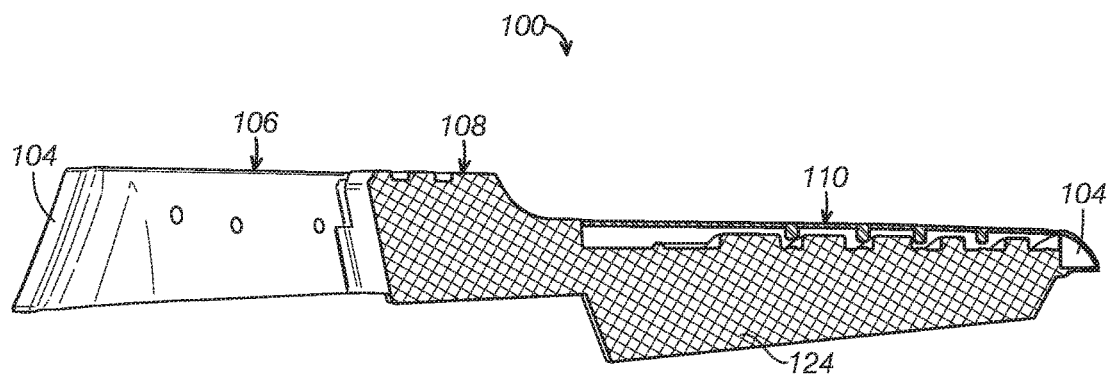
FIG. 2A is a cross section view of the load box rail trim shown in FIG. 1A, depicting a central rib along the entire body of the load box rail trim.
Figure 2B:
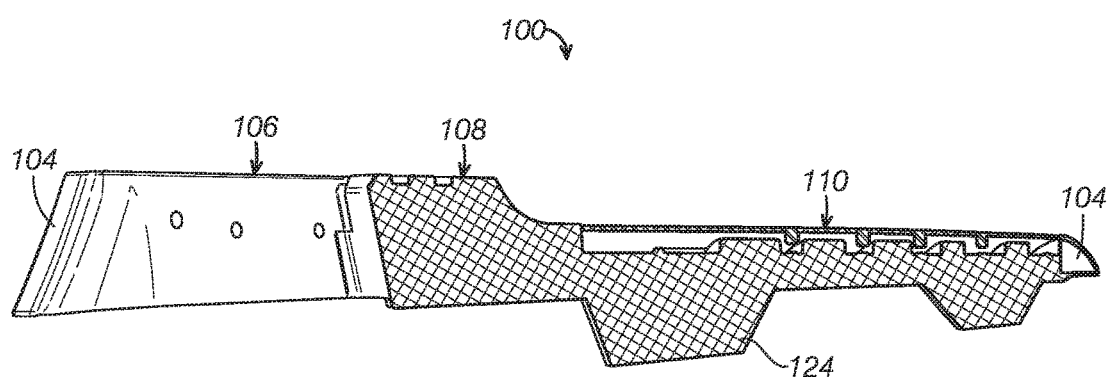
FIG. 2B is a cross section view of the load box rail trim shown in FIG. 1A, depicting an alternate embodiment of the central rib that does not extend below the load box rail trim sides.

Turning to FIGS. 2A-2B, load box rail trim 100 may include a central rib 124 to provide structural features for connection to the sidewall of the load box or enhance the strength of the load box rail. As seen in FIG. 2A, central rib 124 may be disposed in a middle portion of the elongated body 104 or inside the elongated body 104. In the embodiment depicted in FIG. 2A, central rib 124 is disposed substantially along the entire length of elongated body 104 of load box rail trim 100 and extend downward past a flange or wall of load box rail trim 100. The central rib 124 may provide structural features to connect with the sidewall of the load box as described in detail below. The injection molding allows the elongated body 104 have an open cross section and have structural features like central rib 104 integrally formed as tooling can be removed from the opening. The problem of sink mark due to the central rib 104 may be solved by proper design of the placement and thickness of the central rib 104. Sink marks are areas in a molded part where the surface is deformed into a depression, occurring at an area that may be thicker and where cooling may be uneven. the central rib 124 may be up to half as thick as the surface or wall it connects to at the point of connection to reduce visible sink marks if required. In other embodiments, in order to further help ensure that sink marks do not occur in the manufacturing process, the central rib 124 may be only 30% of the thickness of the contacting surface. For maximum strength, the central rib can be made same thickness or thicker, but it should be placed on a feature line or somewhere below the top cover to hide any potential sink from view where a smooth aesthetic appearance is required.

In alternate embodiments, and as seen in FIG. 2B, a central rib 124 may be disposed partially along the length of the elongated body 104 of load box rail trim 100. The central rib may be disposed on the segment having connection points with other parts and may replace metal bracket for the fasteners in some applications Now referring to FIGS. 3-6, example embodiments of the front zone 106 can be seen, and may generally be a taller and slenderer shape than the rest of the elongated body 104 of box rail trim 100. The front zone 106 may include walls and an opening that allow for load box rail trim 100 that can be formed by injection molding. The front zone 106 may also include attachment mechanisms in order to attach other peripherals for added utility or style. In some embodiments, the front zone includes internal support structures having a central rib and horizontal ribs.

Figure 3:
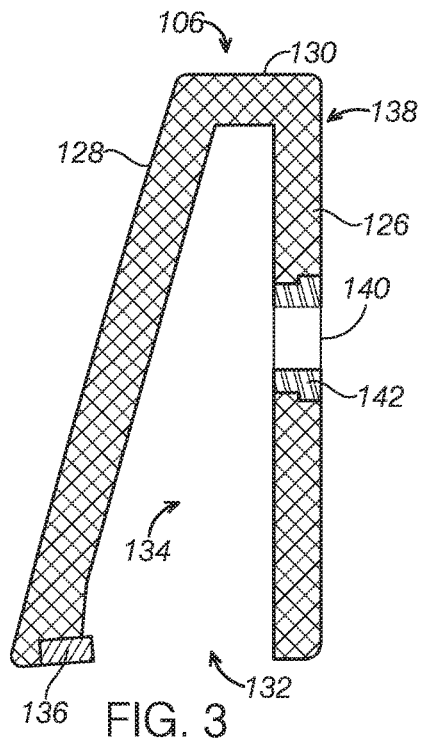
FIG. 3 is a cross section view of the load box rail trim shown in FIG. 1A, depicting a front zone.

Turning to FIG. 3, a cross sectional view of the front zone 106 can be seen. The front zone 106 may include a first sidewall 126, a second sidewall 128, and a top wall 130. Opposite the top wall 130 there may be an opening 132 that opens into a hollow body 134 of load box rail trim 100. The first sidewall 126 may also be called an inner sidewall, and is located on a side of load box rail trim 100 that faces toward the truck bed. The second sidewall 128 may also be called an outside sidewall and is located opposite of the first sidewall 126, on a side of load box rail trim 100 that faces away from the truck bed. First sidewall 126 and second sidewall 128 have a predetermined sidewall thickness, where the thicker the sidewall is, the more rigid the sidewall will be. The thickness of the sidewall adds to the structural integrity and stability of load box rail trim 100. The second sidewall 128 may include a foam strip 136 located at one end of the second sidewall 128 adjacent to the opening 132. The foam strip 136 may be included to help seal the hollow body 134, making load box rail trim 100 water and weather resistant after being attached to a truck bed. The foam strip 136 may also protect the truck bed paint and surface. The first sidewall 126 may also include a foam strip for weather resistance and paint protection.

Still referring to FIG. 3, the top wall 130 connects the first sidewall 126 and second sidewall 128 at a top section 138 of the sidewalls. Opposite the top wall 130, at a bottom section of the sidewalls, is an opening 132. The opening 132 does not include a wall or obstruction and allows access into an internal hollow body 134. The opening 132 and hollow body 134 are an important feature that allows load box rail trim 100 to be formed by injection molding. In order for a part to be injection molded, there must be a way for two separate molds or tooling to come together, for material to be injected into the mold, and the molds to once again separate without interference from the newly formed part. Load box rail trim 100 may be formed by injection molding because toolings are capable of forming the internal structure of load box rail trim 100 and being removed through the opening 132, leaving behind the internal hollow body 134 of load box rail trim 100.

Still referring to FIG. 3, the first sidewall 126 may include an aperture or opening to accommodate attachment of other peripherals for added utility or style. In this example embodiment, first sidewall 126 may include an aperture 140 extending through the thickness of the first sidewall 126. The aperture 140 may include an insert 142 that may be placed in the tooling during or post molding. The insert 142 may be a threaded hole sized to accommodate a threaded bolt, screw, or other attachment mechanism. In alternate embodiments, the aperture 140 may not include threads, but instead may be a hole with smooth edges to accommodate a rope or tie-down, or other type of securing device.

Figure 4:
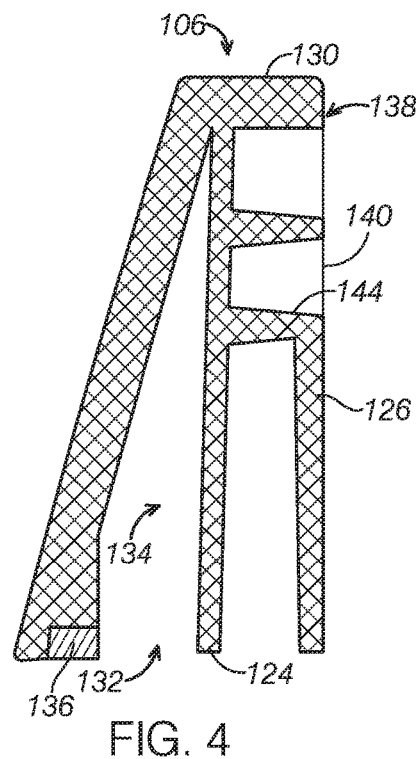
FIG. 4 is a cross section view of the load box rail trim shown in FIG. 1A, depicting an alternate embodiment of the front zone including a central rib with integrated fixing aperture.

Turning to FIG. 4, a cross sectional view of an alternate embodiment of the front zone 106 can be seen. The alternate embodiment of the front zone 106 may include additional internal support structures to add rigidity and stability to the front zone 106. The internal support structures may include a central rib. In this example embodiment, the front zone 106 may include a first sidewall 126 with an aperture 140, a second sidewall 128 with a foam strip 136, a top wall 130, an and opening 132. The front zone 106 may also include a central rib 124.

Still referring to FIG. 4, the central rib 124 may be a vertical structure that runs the entire length of load box rail trim 100, or just a portion of the length of load box rail trim 100. The central rib 124 may be necessary or desired to increase stability and strength of the front zone 106 and of load box rail trim 100. In order to prevent sink marks, a structural and visual problem where material collapses or sinks at the point of intersections, the central rib 124 may be up to half as thick as the part or wall it connects to at the point of connection. In this example embodiment, the central rib 124 connects to the top wall 130, and may be up to half the thickness of the top wall 130 where the central rib 124 and top wall 130 connect. In other embodiments, in order to help ensure that sink marks do not occur in the manufacturing process, the central rib 124 may be only 30% of the thickness of the top wall 130 and/or placed along feature lines or hidden from view by the top cover by strategic placement.

Still referring to FIG. 4, the aperture 140 may extend through the thickness of the first sidewall 126 and to the central rib 124. In this example embodiment, the aperture 140 may include smooth walls without threads or other structures. The aperture 140 may be formed at the same time as the rest of the elongated body 104 of the load box rail trim 100 by using a slider with core pins during the injection molding process. Because the aperture 140 may be formed at the same time by injection molding, the aperture 140 may also include aperture walls 144 that extend through the first sidewall 126 to the central rib 124. The aperture wall 140 provides a structural feature to receive fastener. The aperture walls 144 may also act to add strength by interconnecting the first sidewall 126 to the central rib 124.

Figure 5:
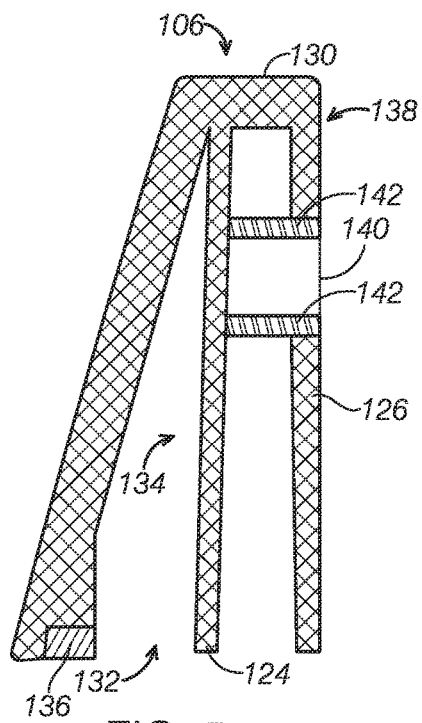
FIG. 5 is a cross section view of the load box rail trim shown in FIG. 1A, depicting another alternate embodiment of the front zone including an insert.

Turning to FIG. 5, a cross sectional view of another alternate embodiment of the front zone 106 can be seen. This alternate embodiment of the front zone 106 is similar to previous embodiments of the front zone 106. In this example embodiment, the front zone 106 may include a first sidewall 126 with an aperture 140 and an insert 142, a second sidewall 128 with a foam strip 136, a top wall 130, an and opening 132. The front zone 106 may also include a central rib 124. In this example embodiment, the aperture 140 may be formed after the rest of the front zone 106 is formed by injection molding. In this case, the aperture may be formed in a post manufacturing process, and an insert 142 inserted into the aperture 140. The insert 142 may include threads or a smooth wall that may facilitate the attachment of peripheral attachments for utility or style, or may accommodate ropes, hooks, or tie-downs, or cargo area covers and canopies.

Figure 6A:
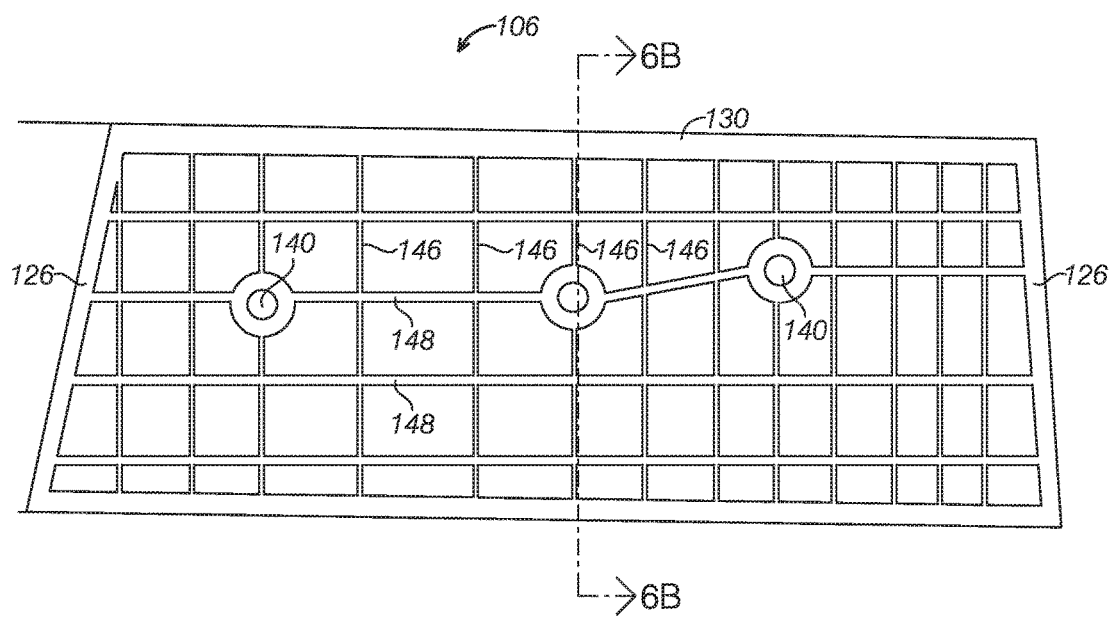
FIG. 6A is a side view of the load box rail trim shown in FIG. 1A, depicting another alternate embodiment of the front zone including lateral ribs.
Figure 6B:
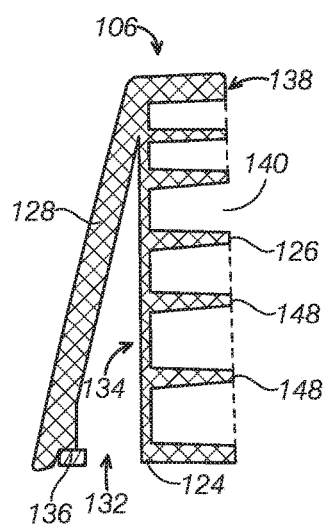
FIG. 6B is a cross section view of the load box rail trim shown in FIG. 6A, depicting the front zone including lateral ribs.

Turning to FIGS. 6A-6B, a side view and a corresponding cross sectional view of still another alternate embodiment of the front zone 106 can be seen. In this alternate embodiment, the front zone 106 may include at least one, or a series of vertical, horizontal, and longitudinal support structures or ribs. In this example of an alternate embodiment, the front zone 106 may include a first sidewall 126 with an aperture 140, a second sidewall 128 with a foam strip 136, a top wall 130, an and opening 132. The front zone 106 may also include a central rib 124. In addition to the central rib 124, there are a series of vertical ribs 146 and lateral ribs 148 that intersect one with another to form an egg-crate shape. The vertical ribs 146 and lateral ribs 148 extend outward from the central rib 124 about to the extent of the first sidewall 126. The vertical ribs 146 and lateral ribs 148 may also assist in providing stability to the central rib 124. It may be necessary for the central rib 124 to be thin enough in relation to the top wall 130 to prevent sink marks. However, the narrower the central rib 124 is, the less stable and strong it becomes. The vertical ribs 146 and lateral ribs 148 may be necessary to increase the strength of the front zone 106 and the central rib 124. This strength may be necessary when a large peripheral attachment may be attached to the front zone 106 of load box rail trim 100. FIG. 6B shows a cross section view of the box rail in the front zone 106 for a single piece molding. As it can be seen, a plurality of apertures 140 are provided along a length of the front zone to form structural features, which can accept plastic thread screws to avoid the need for addition of threaded inserts Now referring to FIGS. 7-8, example embodiments of the transition zone 108 can be seen. The transition zone 108 may include walls and an opening. The transition zone 108 may function to transition the shape and structure of the front zone 106 to the shape and structure of the rear zone 110 in a stylish and functional manner. The following examples embodiments of the transition zone 108 adapt the tall and slender shape of the front zone 106 to a short and wide shape of the rear zone 110. The transition zone 108 may also include structural features, including one or more central ribs, vertical ribs and lateral ribs.

Figure 7:
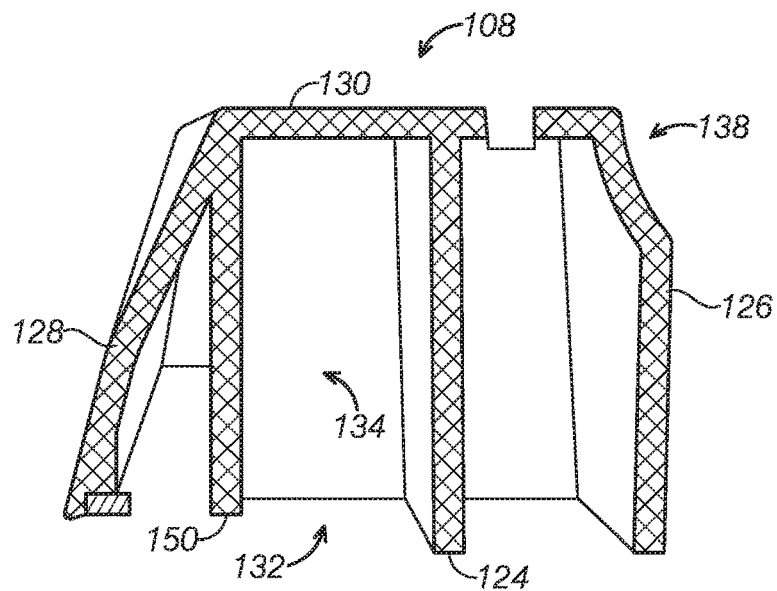
FIG. 7 is a cross section view of the load box rail trim shown in FIG. 1A, depicting a transition zone.

Turning to FIG. 7, a cross sectional view of the transition zone 108 is illustrated. The transition zone 108 may include a first sidewall 126, a second sidewall 128, and a top wall 130. Opposite the top wall 130 there may be an opening 132 that opens into a hollow body 134 of load box rail trim 100. The first sidewall 126 may also be called an inner sidewall, and is located on a side of load box rail trim 100 that faces toward the truck bed. The second sidewall 128 may also be called an outside sidewall and is located opposite of the first sidewall 126, on a side of load box rail trim 100 that faces away from the truck bed. First sidewall 126 and second sidewall 128 have a predetermined sidewall thickness.

Still referring to FIG. 7, the top wall 130 connects the first sidewall 126 and second sidewall 128 at a top section 138 of the sidewalls. Opposite the top wall 130, at a bottom section of the sidewalls, is an opening 132. The opening 132 does not include a wall or obstruction and allows access into an internal hollow body 134. The transition zone 108 may include structural features to provide connection mechanism with other parts and internal support structures to add rigidity and stability to the transition zone 108. The structural features may include a central rib and apertures on the central rib to provide connection place as described in detail below. The internal support structures may include one or more central ribs. In this example embodiment, the transition zone 108 includes a main central rib 124 and a secondary central rib 150. The main central rib 124 may be a vertical structure that runs the entire length of load box rail trim 100, or just a portion of the length of load box rail trim 100. The secondary central rib 150 may also be a vertical structure that runs through the transition zone 108. The main central rib 124, along with the secondary central rib 150, can increase stability and strength of the transition zone 108 and of load box rail trim 100. In this example embodiment, the central rib 124 and secondary central rib 150 may extend as far as the first sidewall 126 or second sidewall 128, such that they do not extend beyond the opening 132.

Referring still to FIG. 7, in order to prevent sink marks, the main central rib 124 and secondary central rib 150 may be up to half as thick as the part or wall it connects to at the point of connection. In this example embodiment, the main central rib 124 and secondary central rib 150 connect to the top wall 130, and may be up to half the thickness of the top wall 130 where the central rib 124 and the secondary central rib 150, and top wall 130 connect. In other embodiments, in order to help ensure that sink marks do not occur in the manufacturing process, the central rib 124 or the secondary central rib may be only 30% of the thickness of the top wall 130 dependent on the manufacturing process selected.

Figure 8:
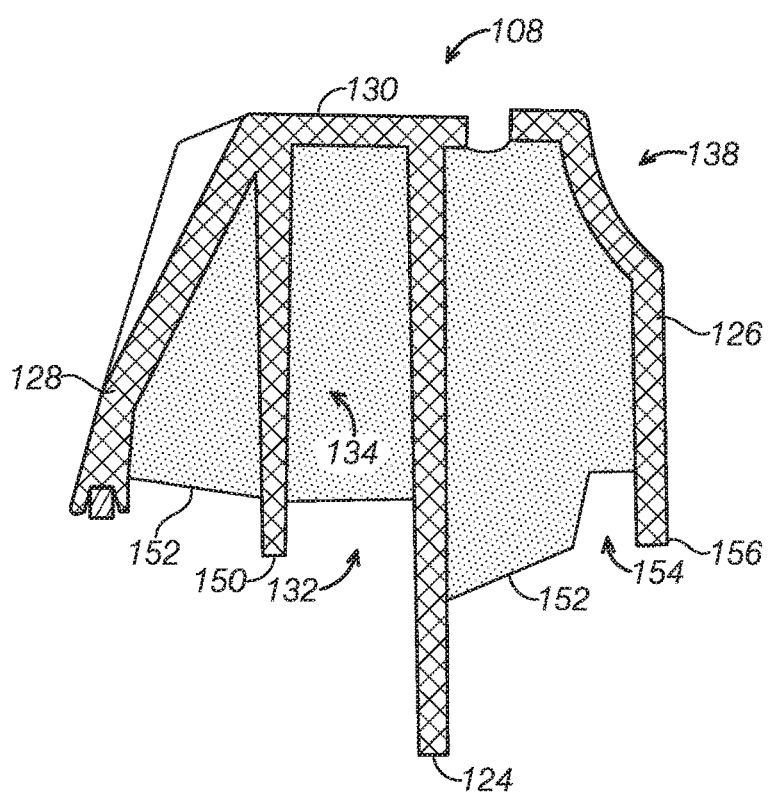
FIG. 8 is a cross section view of the load box rail trim shown in FIG. 1A, depicting an alternate embodiment of the transition zone including an extended central rib.

Turning to FIG. 8, an alternate embodiment of the transition zone 108 can be seen. The alternate embodiment of the transition zone 108 may include structural features and additional internal support structures to add rigidity and stability to the transition zone 108. The additional internal support structures may include lateral ribs and a central rib extending beyond the sidewalls, and beyond the opening. The transition zone 108 may also include features to secure an inner trim cover. An example alternate embodiment of the transition zone 108 may include a first sidewall 126, a second sidewall 128, a top wall 130, an opening 132 opposite the top wall 130, a central rib 124, and a secondary central rib 150. A lateral rib 152 may also be included and extend from the first sidewall 126 to the second sidewall 128. The lateral rib 152 may be up to half as thick as the walls it contacts, including the first sidewall 126, second sidewall 128, and top wall 130 to prevent sink marks.

As can be seen in FIG. 8, the transition zone 108 may also include a central rib 124 that extends beyond the first sidewall 126 and the second sidewall 128, and beyond the opening 132. The central rib 124 may be attached to the truck bed, securing load box rail trim 100 to the truck bed. To attach the central rib 124, a hole may be positioned in the central rib such that a bolt, screw, or other attachment device can be placed through the hole and secure the central rib 124 to the truck bed.

As can be seen in FIG. 8, the transition zone 108 may include structural features to secure coverings that hide any attachment pieces and cover the opening 132. In this example embodiment, the transition zone 108 may include a groove 154 located near an edge portion 156 of the first sidewall 126 that is adjacent to the opening 132. The groove 154 may be a small notch or void in the lateral rib 152 sized to accept an end of the covering. The groove 154 may occur in any or all of the lateral rib 152 supports that may be present intermittently in the transition zone 108. Alternatively, the groove 154 may be formed on the first sidewall 126 and may be intermittent throughout the transition zone 108 or along the entire length of the transition zone 108.

Still referring to FIG. 8, an inner trim cover may be secured by the transition zone 108 in order to cover any bolts, screws, or other attachment devices, as well as cover the opening 132 and hollow body 134 of load box rail trim 100. The inner trim cover may be inserted into the groove 154 located near the edge portion 156 of the first sidewall 126.

Now referring to FIGS. 9-16, example embodiments of the rear zone 110 can be seen. The rear zone 110 may include walls and an opening. The rear zone 110 may be shorter and wider than the front zone 106. The rear zone 110 may also include attachment mechanisms or methods in order to attach load box rail trim 100 to a truck bed. Additionally, the rear zone 110 may include a top cover and an inner cover to cover any bolt or other attachments, and to cover any openings.

Figure 9:
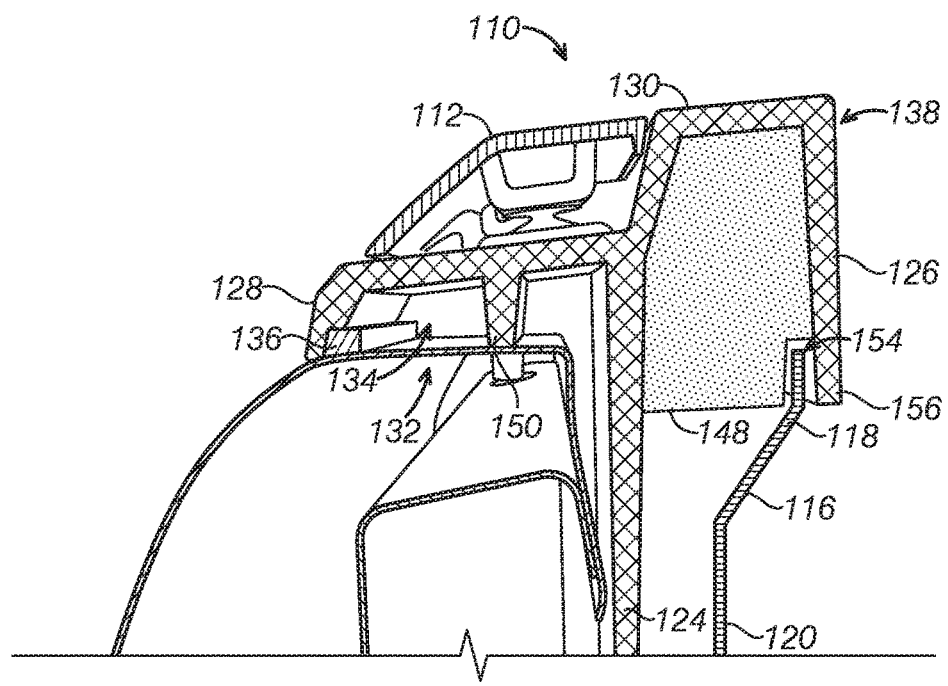
FIG. 9 is a cross section view of the load box rail trim shown in FIG. 1A, depicting a rear zone.

Turning to FIG. 9, a cross sectional view of the rear zone 110 can be seen. The rear zone 110 may include a first sidewall 126, a second sidewall 128, and a top wall 130. Opposite the top wall 130 there may be an opening 132 that opens into a hollow body 134 of load box rail trim 100. The first sidewall 126 may also be called an inner sidewall, and is located on a side of load box rail trim 100 that faces toward the truck bed. The second sidewall 128 may also be called an outside sidewall and is located opposite the first sidewall 126, on a side of load box rail trim 100 that faces away from the truck bed. First sidewall 126 and second sidewall 128 have a predetermined sidewall thickness, where the thicker the sidewall is, the more rigid the sidewall will be. The thickness of the sidewall adds to the structural integrity and stability of load box rail trim 100. The second sidewall 128 may include a foam strip 136 located at one end of the second sidewall 128 adjacent to the opening 132. The foam strip 136 may be included to help seal the hollow body 134, making load box rail trim 100 water and weather resistant after being attached to a truck bed. The foam strip 136 may also protect the truck bed paint and surface.

Still referring to FIG. 9, the top wall 130 connects the first sidewall 126 and second sidewall 128 at a top section 138 of the sidewalls. Opposite the top wall 130, at a bottom section of the sidewalls, is an opening 132. The opening 132 does not include a wall or obstruction and allows access into an internal hollow body 134.

Still referring to FIG. 9, the rear zone 110 may include additional internal support structures to add rigidity and stability to the rear zone 110. The internal support structures may include one or more central ribs. In this example embodiment, the rear zone 110 includes a main central rib 124 and a secondary central rib 150. The main central rib 124 may be a vertical structure that runs the entire length of load box rail trim 100, or just a portion of the length of load box rail trim 100. The secondary central rib 150 may also be a vertical structure that runs through the rear zone 110. The rear zone may further include lateral ribs 148. The main central rib 124, along with the secondary central rib 150 and the lateral ribs 148, can increase stability and strength of the rear zone 110 and of load box rail trim 100.

As can be seen in FIG. 9, the central rib 124 may extend beyond lower ends of the first sidewall 126 and the second sidewall 128, and beyond the opening 132. The central rib 124 functions as a structural feature for attaching the box rail with the truck bed. For example, the central rib 124 may include a hole such that a bolt, screw, or other attachment device can be placed through the hole and secure the central rib 124 to the truck bed. In some embodiments, the central rib 124 may replace a bracket that is commonly used to attach the rail trim to the sidewalls of the load box.

As can be seen in FIG. 9, the rear zone 110 may include additional structural features to secure coverings that hide any attachment pieces and cover the opening 132. In this example embodiment, the rear zone 110 may include a groove 154 located near an edge portion 156 of the first sidewall 126 that is adjacent to the opening 132. The groove 154 may be a small notch or void sized to accept an end of the covering.

Still referring to FIG. 9, an inner trim cover 116 may be secured by the rear zone 110 in order to cover any bolts, screws, or other attachment devices, as well as cover the opening 132 and hollow body 134 of load box rail trim 100. The inner trim cover 116 may include an upper end 118 and a lower end 120. The upper end 118 of the inner trim cover 116 may be inserted into the groove 154 located near the edge portion 156 of the first sidewall 126. The lower end 120 may then be secured to the truck bed or the central rib 124 of the rear zone 110.

Still as seen in FIG. 9, the rear zone 110 may further include a top cover 112. The top cover 112 functions to cover any underlying bolts or attachment mechanisms necessary to attach load box rail trim 100 to a truck bed. In this example embodiment, the top cover 112 includes a thin, elongated body that may snap or otherwise attach to the rear zone 110 of load box rail trim 100.

Figure 10:
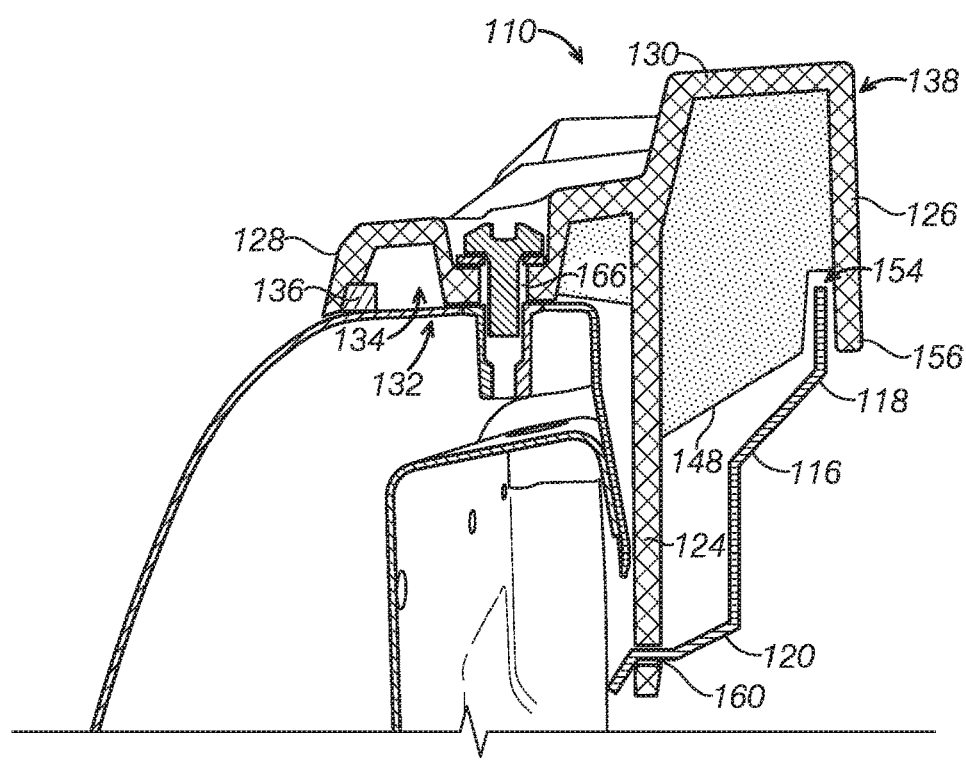
FIG. 10 is a cross section view of the load box rail trim shown in FIG. 1A, depicting the rear zone with a top bolt and a self-retained trim cover attachment.

Turning to FIG. 10, a cross sectional view of the rear zone 110 displaying a top bolt can be seen. The rear zone 110 in this example embodiment of the invention may include a first sidewall 126, second sidewall 128, top wall 130, central rib 124, secondary central rib 150, and inner trim cover 116. Additionally, the rear zone 110 may include a top bolt hole 166 sized to accept a bolt or screw in order to attach load box rail trim 100 to a truck bed. The top bolt hole 166 may include a shoulder design, where the rear zone 110 holds a head of the bolt or screw.

Still referring to FIG. 10, the upper end 118 of the inner trim cover 116 may be inserted into the groove 154 located near the edge portion 156 of the first sidewall 126. The lower end 120 may then be secured to the truck bed or the central rib 124 of the rear zone 110. In this example embodiment, the inner trim cover 116 may be secured by inserting the lower end 120 into a slot 160 or void present in the main central rib 124 of the rear zone. In this example embodiment, the upper end 118 of the inner trim cover 116 could be inserted into the groove 154, and then flexed and a portion of the lower end 120 may then be inserted into a slot 160 on the central rib 124, allowing the inner trim cover 116 to spring into position.

Figure 11:
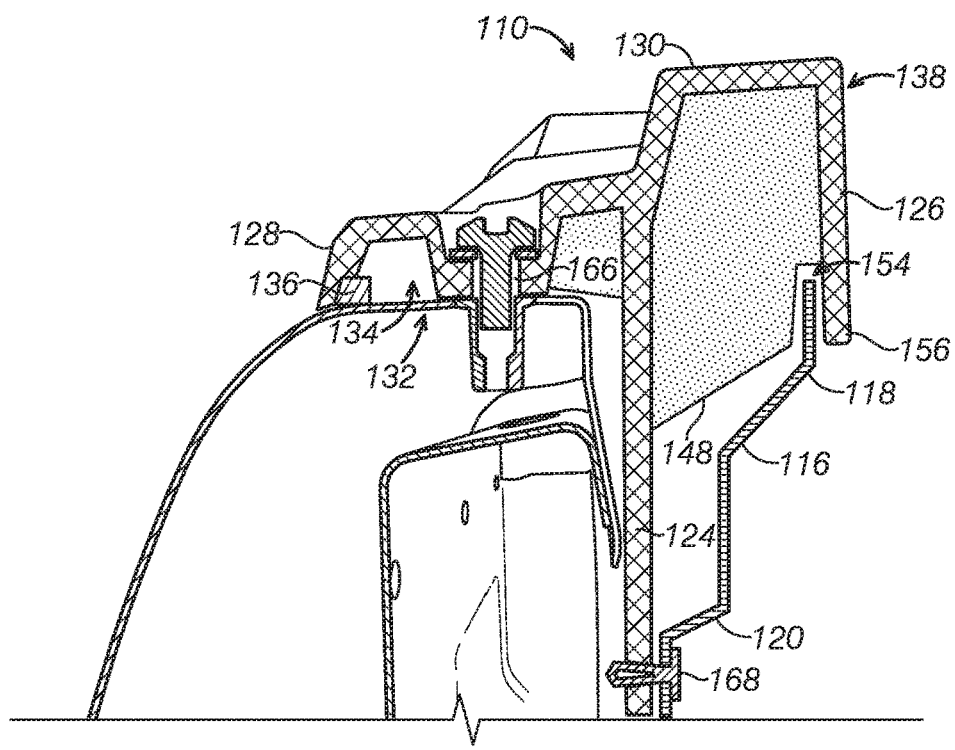
FIG. 11 is a cross section view of the load box rail trim shown in FIG. 1A, depicting the rear zone using a trim cover with a push or snap attachment.

Turning to FIG. 11, a cross sectional view of the rear zone 110 displaying a top bolt can be seen. The rear zone 110 in this example embodiment of the invention may include a first sidewall 126, second sidewall 128, top wall 130, central rib 124, secondary central rib 150, and top bolt hole 166. The central rib 150 may include structural features to attach with other parts. For example, the central rib 150 may include a hole to receive the fastener. In the depicted embodiment, an inner trim cover 116 may attach at a lower end 120 to the central rib 124 by passing a fastener through the hole in the central rib 150 and a hole in the inner trim cover 116 using a push or snap attachment 168 or a bolt/nut.

Turning to FIGS. 12-16, a cross sectional view of the rear zone 110 displaying attachment methods of a central rib 124 to a truck bed can be seen. Each of the following example embodiments of the rear zone 110 may include a first sidewall 126, second sidewall 128, top wall 130, opening 132, secondary central rib 150, and main central rib 124.

Figure 12:
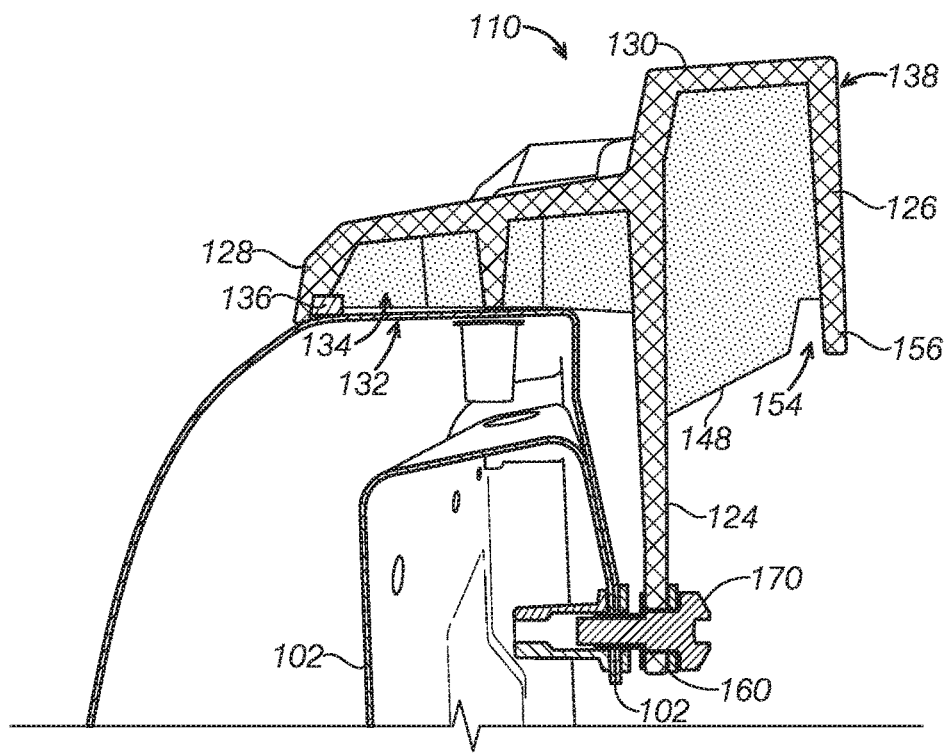
FIG. 12 is a cross section view of the load box rail trim shown in FIG. 1A, depicting the rear zone using a bolt attachment.

Turning to FIG. 12, an example embodiment of an attachment may include the central rib 124 having a slot 160, and an adjustable shoulder fastener 170 may be inserted into the slot and connect the central rib 124 to the truck bed 102. This example embodiment is ideal when the central rib 124 must be attached to the truck bed 102 to increase stability and rigidity, and secure load box rail trim 100 to the truck bed. The central rib 124 and sheet metal of the truck bed may flex to allow for a satisfactory fit while allowing for vertical loading requirements. Using a single fastener is desirable because it reduces parts needed and lowers manufacturing costs associated with load box rail trim 100.

Figure 13A:
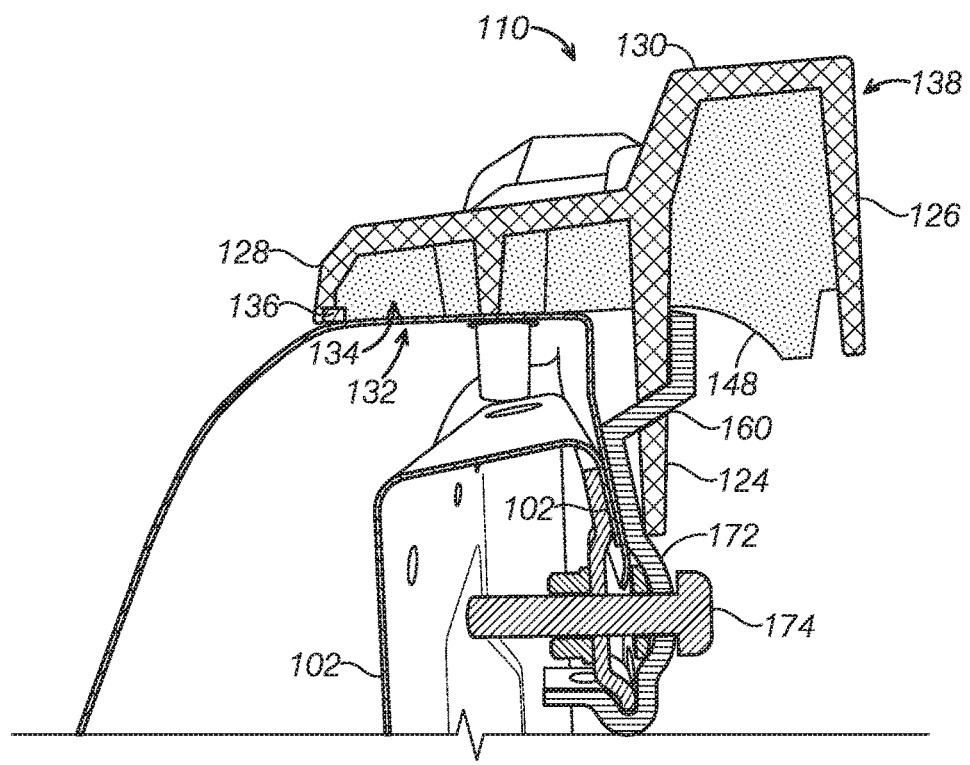
FIG. 13A is a cross section view of the load box rail trim shown in FIG. 1A, depicting the rear zone using a pivot bracket.

Turning to FIG. 13A, an example embodiment of an attachment may include the central rib 124 having a slot 160, and a pivot bracket 172 may be inserted into the slot to attach load box rail trim 100 to a truck bed 102. In this example embodiment, the pivot bracket 172, which may be made from a rigid material such as aluminum, may be inserted from behind the central rib 124 and out through the slot 160, securing itself using interference from the central rib 124. The pivot bracket 172 may then pivot into place and be secured to the truck bed 102 using a lower bolt 174, or alternate attachment mechanism.

Figure 13B:
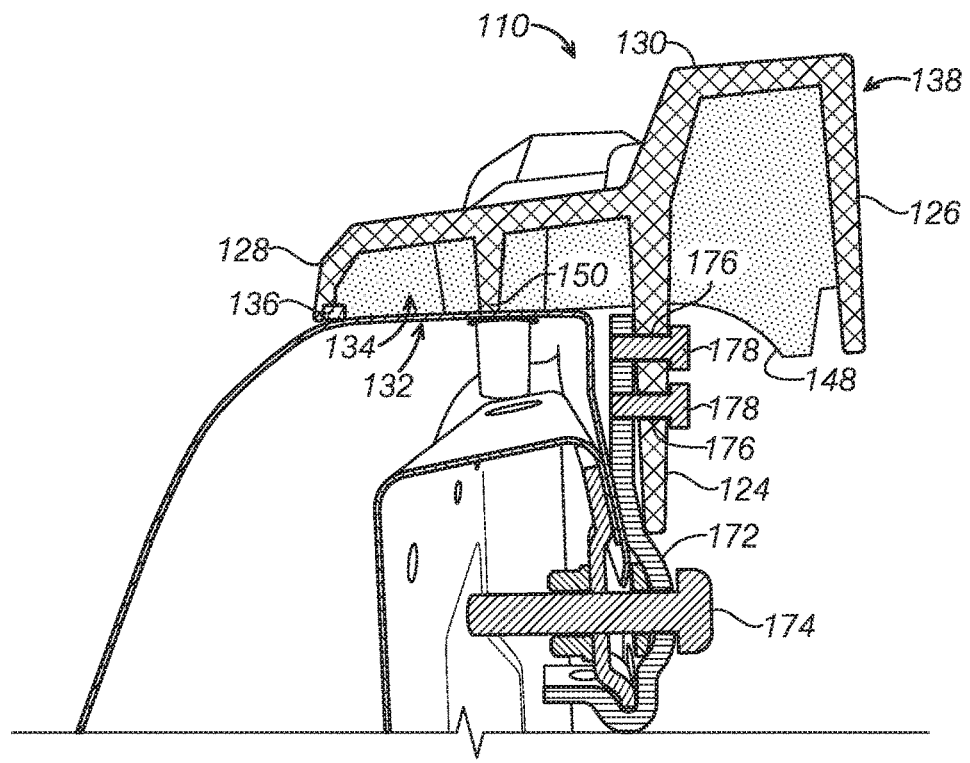
FIG. 13B is a cross section view of the load box rail trim shown in FIG. 1A, depicting the rear zone using a pivot bracket with shoulder bolts.

Turning to FIG. 13B, an example embodiment of an attachment may include a pivot bracket 172 and the central rib 124, where the central rib 124 includes one or more holes for receiving nut insets 176. Alternatively, the nut inserts may be integrated with the central rib during the injection molding by placing in the mold during molding. The pivot bracket 172 may be secured to the central rib 124 with one or more shoulder bolts 178, and secured to the truck bed 102 using a lower bolt 174.

Figure 14:
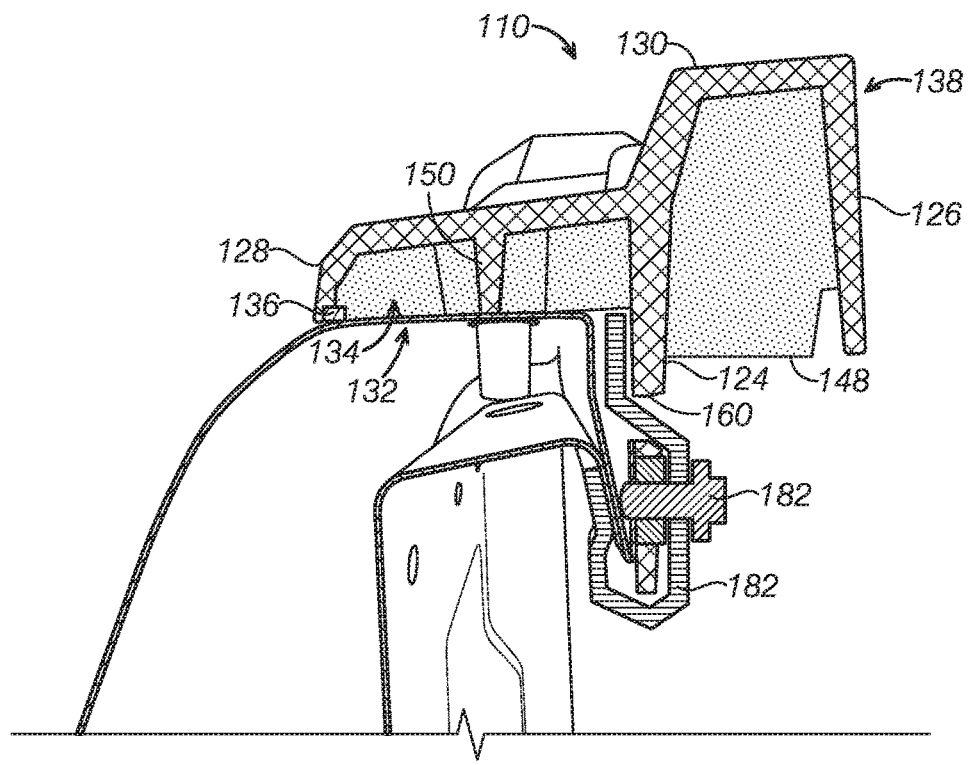
FIG. 14 is a cross section view of the load box rail trim shown in FIG. 1A, depicting the rear zone using a slip hook bracket.

Turning to FIG. 14, an example embodiment of an attachment may include the central rib 124 having a slot 160, and a slip hook bracket 180 may be inserted into the slot to attach load box rail trim 100 to a truck bed 102. In this example embodiment, the slip hook bracket 180, which may be made from a rigid material such as aluminum, may be inserted from in front of the central rib 124 and out through the slot 160 and behind the central rib 124, securing itself using interference from the central rib 124. The slip hook bracket 180 may then pivot into place and be secured to the truck bed 102 using a load box flange 182, or alternate attachment mechanism.

Figure 15:
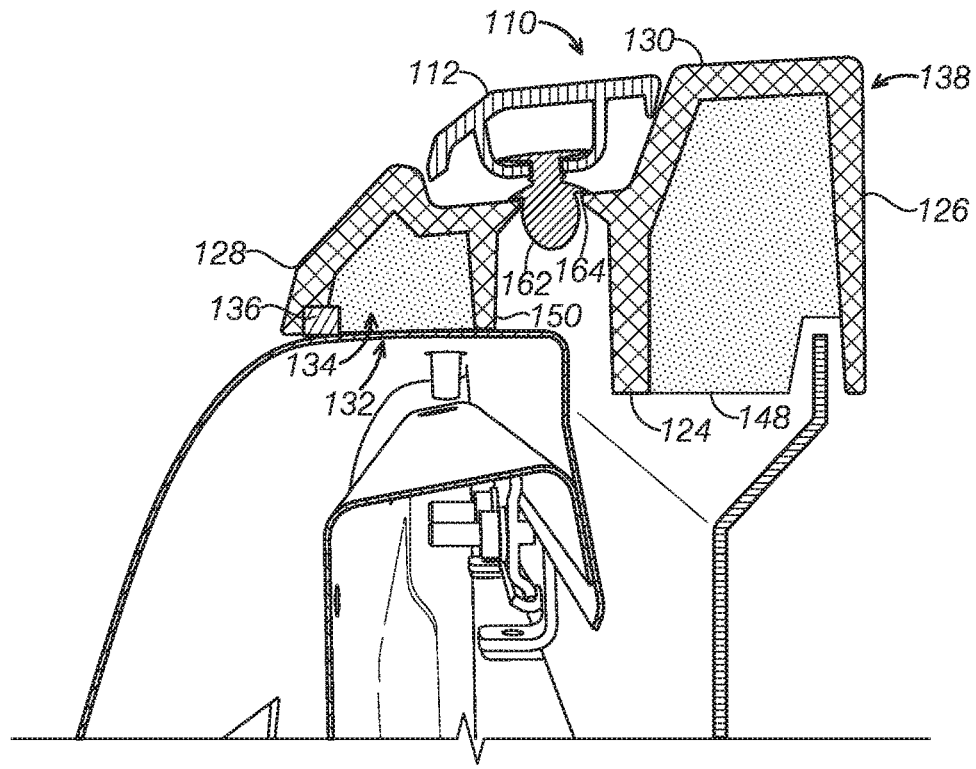
FIG. 15 is a cross section view of the load box rail trim shown in FIG. 1A, depicting the rear zone with a top cover attachment.

Turning now to FIG. 15, the top cover 112 may fit directly into load box rail trim 100. Top cover 112 may include a snap 162 or other attachment mechanism that may interface or snap together with a top hole 164 located on the top wall 130 of load box rail trim 100. By removing additional inserts and by injection molding the top cover 112 and load box rail trim 100, time and materials may be saved, reducing weight and manufacturing costs.

Figure 16:
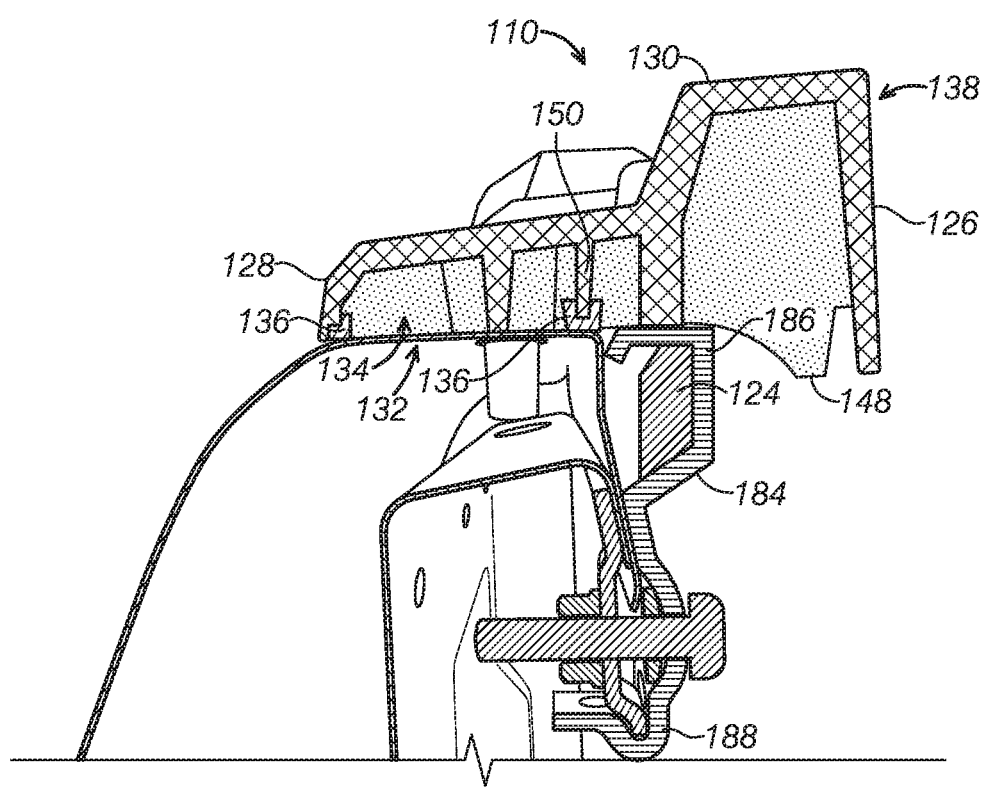
FIG. 16 is a cross section view of the load box rail trim shown in FIG. 1A, depicting the rear zone using one or more foam strips and alternative hook brackets.

Turning to FIG. 16, a foam strip 136 may be used on the second sidewall 128 at one end of the second sidewall 128 adjacent to the opening 132. Additionally, a foam strip 136 may be used on the internal support structures of load box rail trim 100, including the secondary central rib 150. The foam strip 136 may help seal the hollow body 134, making load box rail trim 100 water and weather resistant after being attached to a truck bed. The foam strip 136 may also protect the truck bed paint and surface. FIG. 16 further shows a bracket 184 having a loop-shaped upper portion 186 and a loop-shaped lower portion 188. The load box rail trim includes structural features such as central rib 124. The central rib 124 and other features on the central rib 124 such as apertures can accommodate various designs of bracket or connection parts to connect the rail trim with the metal sheet of the truck bed and/or other parts such as an inner trim cover.

Figure 17A:
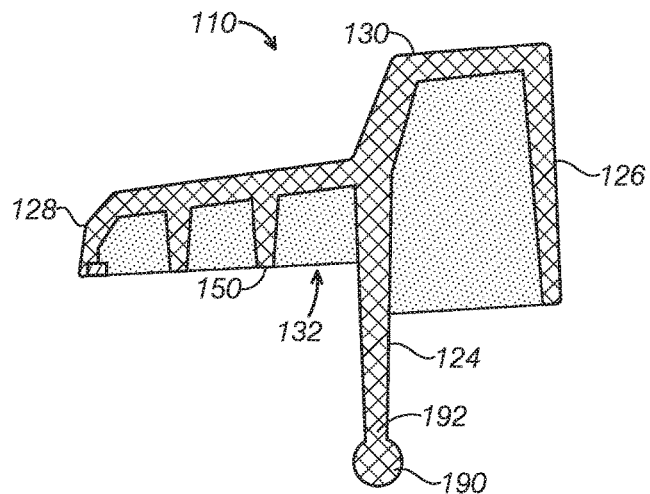
FIG. 17A is a cross section view of the load box rail trim shown in FIG. 1A, depicting the rear zone with a pivotal insert configuration of a central rib to utilize alternate attachment mechanisms or brackets.
Figure 17B:
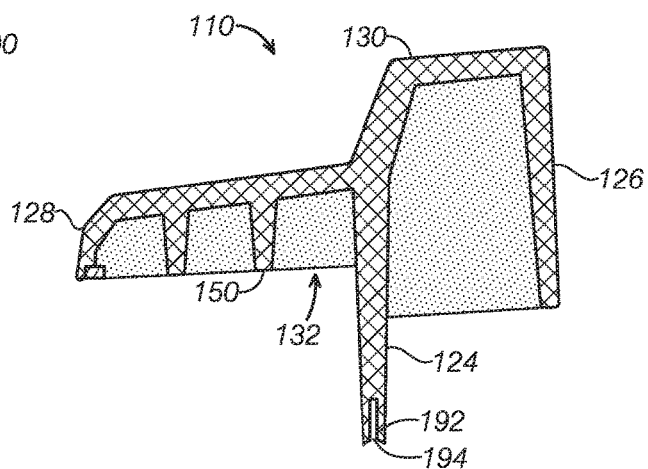
FIG. 17B is a cross section view of the load box rail trim shown in FIG. 1A, depicting the rear zone with pivotal surface or socket configuration of a central rib to utilize alternate attachment mechanisms or brackets.
Figure 17C:
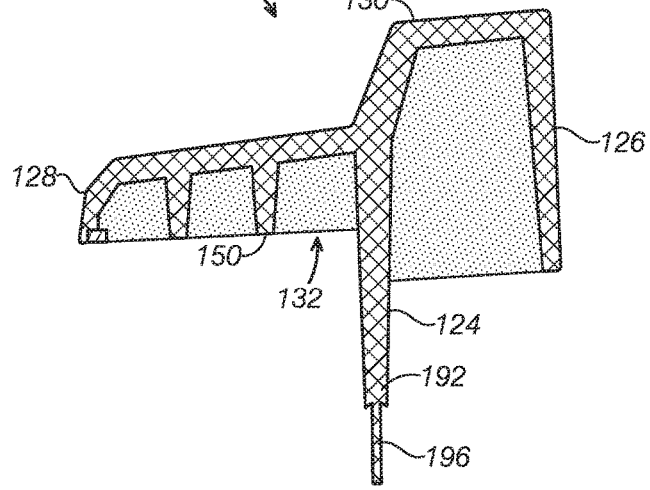
FIG. 17C is a cross section view of the load box rail trim shown in FIG. 1A, depicting the rear zone with a slender insert configuration of a central rib to utilize alternate attachment mechanisms or brackets such as heat-staking.

Turning to FIGS. 17A-17C, a cross sectional view of the rear zone 110 displaying alternate example embodiments of a central rib 124 can be seen. Each of the following example embodiments of the rear zone 110 may include a first sidewall 126, second sidewall 128, top wall 130, opening 132, secondary central rib 150, and main central rib 124. The central rib may be configured to have various shape to accommodate different brackets to be attached to the sidewall of load box.

Turning to FIG. 17A, the central rib 124 may include a pivot joint 190 located at a bottom end 192 of the central rib 124. The pivot joint 190 may be a round or cylindrical portion of the central rib 124 and allow for load box rail trim 100 to be attached to a truck bed using an alternate attachment mechanism. For example, the pivot insert 190 may be inserted into a socket joint or recess of a bracket, where the bracket is attached to the truck bed. Load box rail trim 100 may then rotate into place and secured.

Turning to FIG. 17B, the central rib 124 may include a pivot surface 194 located at a bottom end 192 of the central rib 124. The pivot surface 194 may be a round or cylindrical socket or indent and allow for load box rail trim 100 to be attached to a truck bed using an alternate attachment mechanism. For example, the pivot surface 194 may be attached over or onto a ball joint or surface of a bracket, where the bracket is attached to the truck bed. Load box rail trim 100 may then rotate into place and secured. Alternatively, the pivot bracket could be attached directly to the bracket using a screw or bolt.

Turning to FIG. 17C, the central rib 124 may include a slender molded pin or tab 196 located at a bottom end 192 of the central rib 124. The slender insert 196 may be a thin, slender portion of the central rib 124 extending from the bottom end 192 and allow for load box rail trim 100 to be attached to a truck bed using an alternate attachment mechanism. For example, the slender molded pin or tab 196 may be inserted into a recess bracket, where the bracket is attached to the truck bed. Additionally or alternatively, the central rib 124 may be connected to a pivot via heat staking by placing the slender insert 196 into a through hole in the pivot.

Turning attention to FIGS. 18-20B, another example embodiment of a load box rail trim will now be described. Load box rail trim 200 includes many similar or identical features to load box rail trim 100. Thus, for the sake of brevity, each feature of load box rail trim 200 will not be redundantly explained. Rather, key distinctions between load box rail trim 200 and load box rail trim 100 will be described in detail and the reader should reference the discussion above for features substantially similar between the two load box rail trims.

Figure 18:
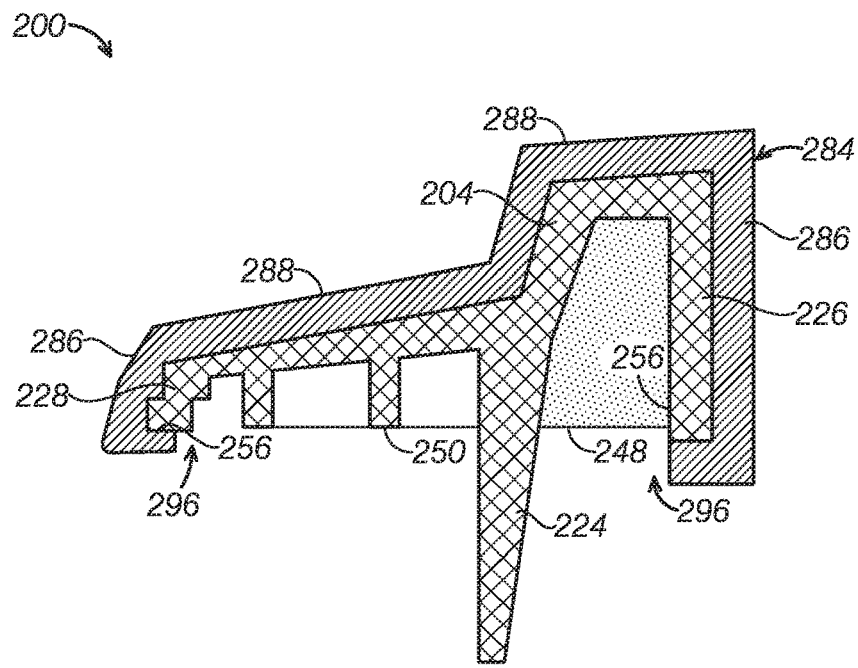
FIG. 18 is a cross section view of a second example embodiment of a load box rail trim, depicting a body and a facia that snap together with a dove tail configuration.
Figure 20A:
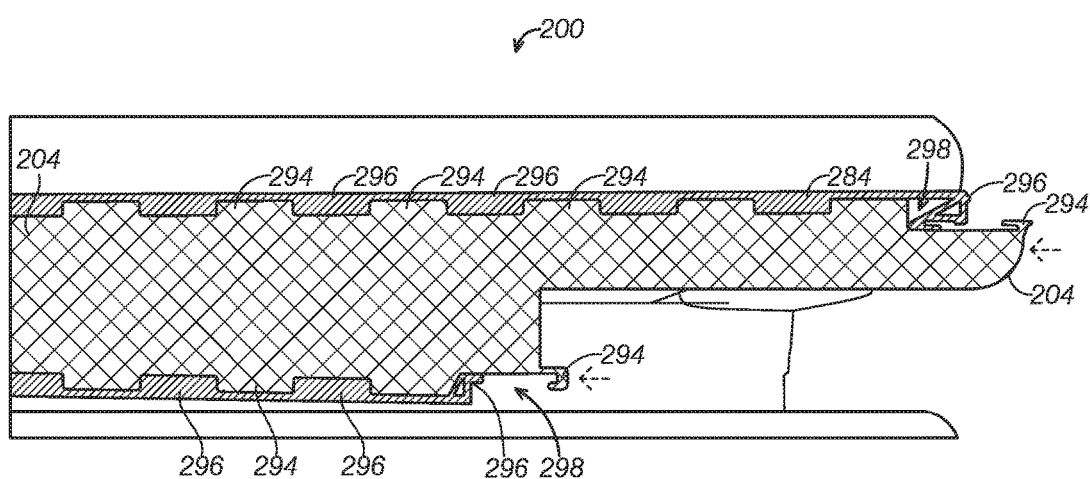
FIG. 20A is a cross section view of the load box rail trim shown in FIG. 18, depicting a keyway attachment system where the system is in an open and unattached position.
Figure 20B:
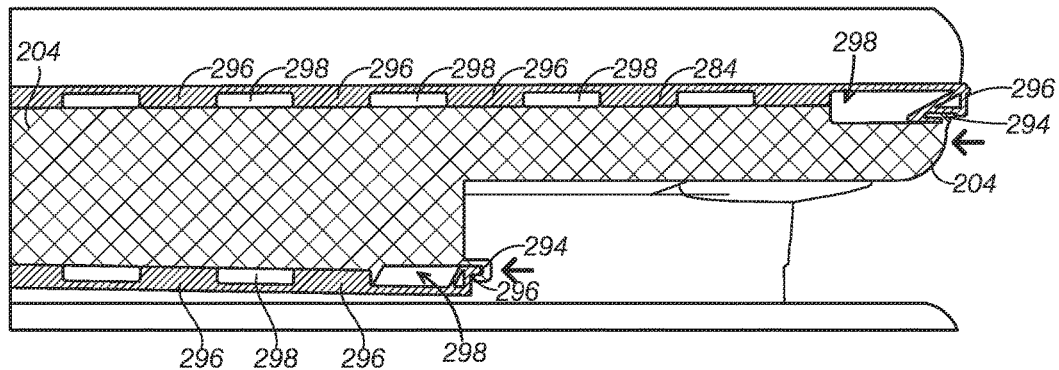
FIG. 20B is a cross section view of the load box rail trim shown in FIG. 18, depicting a keyway attachment system where the system is in a locked and attached position utilizing dove tail and keyway type interface.

As can be seen in FIG. 18, and FIGS. 20A-20B, load box rail trim 200 may include a facia coupled to an elongated body of the load box rail trim 200. Turning to FIG. 18, the load box rail trim 200 may comprise an elongated body 204 including a first sidewall 226, a second sidewall 228, a central rib 224, secondary central rib 250, and lateral ribs 248. The first sidewall 226 and second sidewall 228 may include an edge portion 256 configured to couple to a facia 284.

As can be seen in FIG. 18, the facia 284 may be a shell or outer layer that encompasses an internal support structure of the elongate body 204. The elongated body 204 and the facia 284 may be formed by injection molding and the facia 284 may contribute to the strength and provide aesthetic appearance. The facia 284 may include sidewalls 286 and a top facia wall 288, with a facia opening 296 opposite the top facial wall 288. In this example embodiment, facia 284 may fit over the elongated body 204 and attach to the elongated body 204 using a snap fit or dovetail feature, where the facia 284 snaps to the edge portion 256 of the first sidewall 226 and the second sidewall 228.

Figure 19:
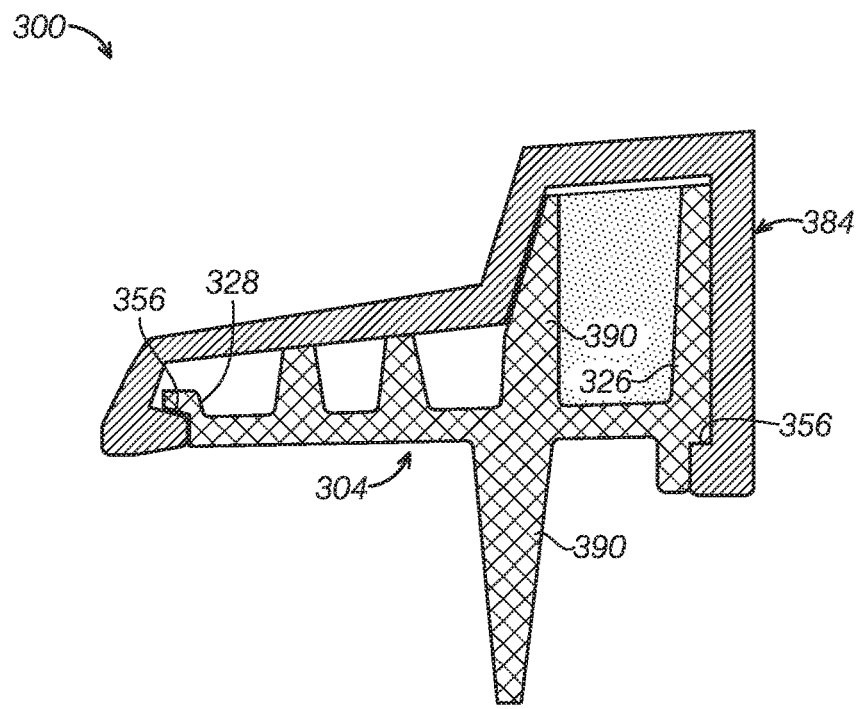
FIG. 19 is a cross section view of another example embodiment of a load box rail trim, depicting a body and facia, where the rear zone of the body has a lateral rib and no top wall.

FIG. 19, shows another embodiment of a two-piece load box rail trim 300. The rail trim 300 may comprise a facia 384 and an elongated body 304 having structural features such as a plurality of ribs. For example, the elongated body 304 may include a main, longitudinal rib 390 that extends along a length of the elongated body 304 and a first sidewall 326 and a second sidewall 328. The facia 384 may fit over the elongated body 304 and attach to the elongated body 304 using a snap fit or dovetail feature, where the facia 384 snaps to the edge portion 356 of the first sidewall 326 and the second sidewall 328.

FIGS. 20A and 20B shows a method of assembly a facia and an elongated body. The load box rail trim 200 is used for the illustration. The facia 284 may be attached to the elongated body 204 using a keyway feature. In this example embodiment, the elongated body 204 may include body keyway attachments 294 that include a plurality of edges or portions extending outward from a base of the elongated body 204, and are intermittent along a length of the elongated body 204. The facia 284 may include facia keyway attachments 296 including a plurality of edges and portions of the facia that extend outwards from a base of the facia 284, and are intermittent at similar intervals as the body keyway attachments 294 along a length of the facia 284. In order to attach or connect the facia 284 to the elongated body 204 using the keyway feature, the facia 284 is placed over the elongated body 204 through the multiple notches 298 such that the fascia keyway tab attachments 294 and the body keyway tab attachments 294 move past one another to form a dovetail enabling retention of fascia 284 to the structural elongated body 204. After the facia 284 is placed over the elongated body 204 in the open position, they are slide across one another, and the facia keyway attachments 294 interlock with the body keyway attachments 294, thus attaching the facia 284 to the elongated body 204.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions, and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A load box rail trim disposed on a top of box rail of a truck, comprising:
    an elongated body formed by a top wall, a first sidewall, and a second sidewall and having an opening along a length of the body and opposite the top wall; and
    at least one structural feature integrated on the body, wherein at least one structural feature includes a central rib disposed in a space of the body along a length direction of the body and configured to provide connection with fastening member to attach the load box rail trim with the truck, wherein the central rib is connected to the top wall, substantially perpendicular to the top wall, and extends down toward the opening; and
    wherein the elongated body and the central rib are integrally formed in an injection molding.

2. The load box rail trim of claim 1, wherein the central rib is disposed between the first and second sidewalls substantially along the length of the mew body.

3. The load box rail trim of claim 1, wherein the central rib is disposed between the first and second sidewalls partially along the length of the body.

4. The load box rail trim of claim 1, wherein the at least one structural feature further includes a plurality of lateral ribs substantially parallel to the top wall and disposed on the central rib along a predetermined length.

5. The load box rail trim of claim 1, wherein the central rib is disposed in the opening of the body along the length of the body and extends over a lowest surface of the body, and wherein the central rib includes an aperture to receive a fastening member.

6. The load box rail trim of claim 1, wherein the central rib has an end extending over a lowest surface of the body, and wherein the end of the central rib is configured to have a shape to be fitted into a receiving part of a connector.

7. The load box rail trim of claim 1, further includes a facia coupled on the body.

8. The load box rail trim of claim 7, wherein edge portions of the first and second sidewalls of the body include dovetail features and edge portions of the facia includes corresponding dovetail features and wherein the facia is snap fit with the body via the dovetail features.

9. The load box rail trim of claim 7, wherein the facia is disposed adjacent and along a length of the body, and at least portion of the facia is configured to have a shape conforming with a shape of the body.

10. The load box rail trim of claim 7, wherein the facia includes a top wall, sidewalls and an opening opposite to the top wall, and wherein the body includes an elongated plate and is snap fit along an edge of the sidewalls of the facia.

11. A load box rail trim disposed on a top of a box rail of a truck, comprising:
an elongated body formed by at least one wall, wherein the body includes a central rib, a plurality of ribs and a plurality of opening on one of the ribs to provide a connection with a load box of the truck and wherein the central rib extends down toward the box rail, and configurations of the ribs are different along a length of the body; and
a facia disposed along a length of body and connected to the body, wherein the facia includes a side wall and a top facia wall and a facia opening opposite the top facia wall; and
wherein the body and the facia are separate pieces formed in an injection molding.

12. The load box rail trim of claim 11, wherein the facia is connected to the body via snap fitting and via a fastener.

13. A load box rail trim assembly, comprising:
a rail trim including an elongated body defined by a top wall, an outside sidewall and an inner sidewall and a plurality of structural features, wherein a side of the body opposite to the top wall is open, wherein the body and the structural features are integrally formed in an injection molding; and
a connector coupled with the at least one of the plurality structural features,
wherein the plurality of structural features include a central rib disposed inside the outside and inner sidewalls and a first aperture on the central rib, wherein the central rib extends along a length of the rail trim and have an end extending down over a lower end of the outside sidewall in a direction of the opening, and wherein the first aperture is configured to receive a fastening member.

14. The load box rail trim assembly of claim 13, further comprising an inner trim cover having a lower end and an upper end and connected to the inner sidewall, wherein the plurality of structural features include a groove at an edge portion of the inner sidewall of the rail trim, wherein the central rib further includes a second aperture, and wherein the inner trim cover is made from flexible material and is connected to the rail trim by inserting the upper end to the groove and flex the lower end into the second aperture of the central rib.

15. The load box rail trim assembly of claim 13, further comprising an inner trim cover having a lower end and an upper end and connected to the inner sidewall, wherein the plurality of structural features includes a groove at an edge portion of the inner sidewall of the rail trim, and wherein the inner trim cover is connected to the rail trim by inserting the upper end of inner trim cover to the groove and then connecting the lower end to the first aperture of the central rib via a fastener.

16. The load box rail trim assembly of claim 13, wherein the connector includes a plate having a first portion and a second portion, wherein the plate is configured to have the first portion to contact an end of the central rib and the second portion to contact a sheet metal of a load box such that the plate is retained by interference and wherein the second portion is fixed to the sheet metal by a fastener.

17. The load box rail trim assembly of claim 16, wherein one of the first portion and second portion has a curved shape to impart flexibility to the plate.

18. The load box rail trim assembly of claim 13, further comprising a facia disposed on the body, and wherein the body and the facia are formed separately in an injection molding.

19. The load box rail trim of claim 1, wherein a thickness of the central rib is no greater than a half of a thickness of the top wall.

20. The load box rail trim assembly of claim 13, wherein a thickness of the central rib is no greater than a half of a thickness of the top wall.

* * * * *